United States Patent
Parsonese et al.

(10) Patent No.: US 9,195,859 B2
(45) Date of Patent: Nov. 24, 2015

(54) SELECTIVELY SECURING A HOT-SWAPPABLE DATA STORAGE DEVICE TO PREVENT DATA CORRUPTION

(71) Applicant: International Business Machines Corporation, Armonk, NY (US)

(72) Inventors: James J. Parsonese, Cary, NC (US); Jimmy X. Tang, Raleigh, NC (US); Kevin S D Vernon, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 372 days.

(21) Appl. No.: 13/874,636

(22) Filed: May 1, 2013

(65) Prior Publication Data

US 2014/0331009 A1    Nov. 6, 2014

(51) Int. Cl.
*G11B 17/08* (2006.01)
*G06F 1/16* (2006.01)
*G06F 21/80* (2013.01)

(52) U.S. Cl.
CPC ..................................... *G06F 21/80* (2013.01)

(58) Field of Classification Search
CPC ............... G11B 20/1833; G11B 20/18; G11B 11/1076; G06F 1/181; G06F 1/1616; G06F 1/187; G06F 1/184; G06F 21/31; G06F 17/16; G06F 17/225; G06F 17/22

USPC ........ 714/768, 769, 770; 361/679.57, 679.58, 361/679.33; 711/115; 369/30.41, 30.42, 369/30.43, 30.45, 30.61; 340/686.4; 713/193; 360/96.51, 97.11, 99.24, 360/98.06
See application file for complete search history.

(56) References Cited

U.S. PATENT DOCUMENTS

| | | | | |
|---|---|---|---|---|
| 5,077,722 | A  * | 12/1991 | Geist et al. ..................... | 720/657 |
| 6,459,572 | B1 * | 10/2002 | Huang et al. ............. | 361/679.57 |
| 6,487,623 | B1   | 11/2002 | Emerson et al. | |
| 6,774,808 | B1 * | 8/2004  | Hibbs et al. ................ | 340/686.4 |
| 6,826,764 | B2   | 11/2004 | Fujisawa | |
| 7,327,564 | B2 * | 2/2008  | Carlson et al. ........... | 361/679.33 |
| RE43,119  | E  * | 1/2012  | Chu .............................. | 713/193 |
| 2003/0193851 | A1 * | 10/2003 | Mueller et al. ............. | 369/30.41 |
| 2010/0023956 | A1 | 1/2010 | Bondurant et al. | |
| 2010/0058017 | A1 | 3/2010 | Bitar et al. | |

* cited by examiner

*Primary Examiner* — Nabil Hindi
(74) *Attorney, Agent, or Firm* — Katherine S. Brown; Jeffrey L. Streets

(57) ABSTRACT

A method and computer program product secure a hot-swap data storage device against being manually physically removed from an operable position within a chassis bay of a computer system. The hot-swap data storage device is released to be manually physically removed from the operable position within the chassis bay of the computer system in response to determining that the data storage device is not active. The hot-swap data storage device may, for example, be secured and released using an electronically-actuated lock.

17 Claims, 7 Drawing Sheets

SELECTIVELY SECURING A HOT-SWAPPABLE DATA STORAGE DEVICE TO PREVENT DATA CORRUPTION

BACKGROUND

1. Field of the Invention

The present invention relates to hot-swappable data storage devices and methods of preventing data corruption.

2. Background of the Related Art

Computer systems typically include one or more data storage devices that store an operating system, applications, and data. Large computer systems will often include multiple data storage devices, either to increase data storage capacity or redundancy. These data storage devices may be configured in various ways, such as a redundant array of independent disks (RAID) or a storage area network (SAN).

"Hot swapping" of a data storage device occurs when the data storage device is removed and returned/replaced without shutting down the system in which it is a component. It may be beneficial to hot swap a data storage device in order to repair, reconfigure, upgrade, or replace the data storage device. Accordingly, any known configuration of one or more data storage devices may benefit from having one or more data storage device that is hot swappable. A "simple swap device" is a data storage device that may be the only data storage device for a computer system, such that removal of the simple swap device during system operation may lead to data or operating system corruption. By contrast, a hot swap device in a RAID environment may be removed at almost any time without data corruption.

BRIEF SUMMARY

One embodiment of the present invention provides a method comprising securing a hot-swap data storage device against being manually physically removed from an operable position within a chassis bay of a computer system, and releasing the hot-swap data storage device to be manually physically removed from the operable position within the chassis bay of the computer system in response to determining that the data storage device is not active.

Another embodiment of the present invention provides a computer program product including computer readable program code embodied on a computer readable storage medium. The computer program product comprises computer readable program code for securing a hot-swap data storage device against being manually physically removed from an operable position within a chassis bay of a computer system, and computer readable program code for releasing the hot-swap data storage device to be manually physically removed from the operable position within the chassis bay of the computer system in response to determining that the data storage device is not active.

DETAILED DESCRIPTION

Figure 1:
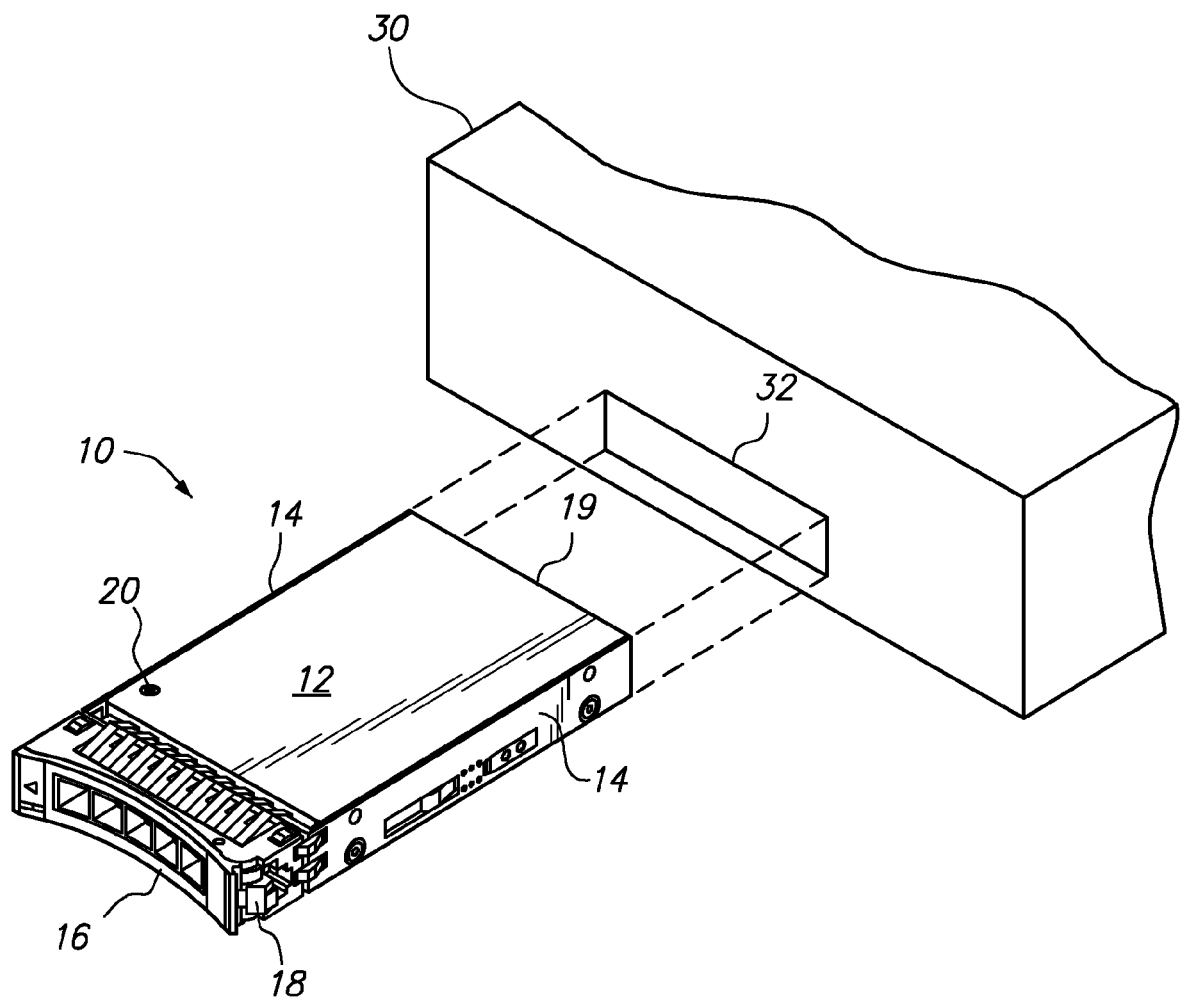
FIG. 1 is a diagram of a data storage device in alignment for insertion into a bay of a computer system.

One embodiment of the present invention provides a method comprising securing a hot-swap data storage device, such as a hard disk drive or solid state drive, against being manually physically removed from an operable position within a chassis bay of a computer system, and releasing the hot-swap data storage device to be manually physically removed from the operable position within the chassis bay of the computer system in response to determining that the data storage device is not active.

The hot-swap data storage device is preferred to be secured and released using an electronically actuated lock. The electronically actuated lock may be included with the chassis or with the data storage device. Optionally, the electronically-actuated lock may include a solenoid. In one embodiment, a solenoid has an electrical coil that can selectively extend a locking pin. If the solenoid is included with the chassis, the solenoid selectively extends the locking pin into engagement with a portion of the data storage device. If the solenoid is included with the data storage device, the solenoid selectively extends the locking pin into engagement with a portion of the chassis. In either configuration, extension of the locking pin prevents removal of the data storage device from the chassis.

The hot-swap data storage device may be secured in response to the assertion of a general purpose input output (GPIO) signal. Accordingly, the assertion of the GPIO signal may be provided to the electronically actuated lock, for example to cause a solenoid to extend a locking pin. Similarly, the hot-swap data storage device may be released in response to deassertion of the general purpose input output (GPIO) signal, such as by causing a solenoid to retract a locking pin. The data storage device is preferably unlocked during power on until the firmware detects the data storage device as a bootable device. The device lock control logic will lock the drive just before handing over execution to the OS.

Alternatively, the securing and releasing of the hot-swap data storage device may be controlled by a serial general purpose input output (SGPIO) signal, which may include activity, fault and locate bits. Accordingly, the hot-swap data storage device may be determined to be "not active" in response to assertion of the activity, fault and locate bits.

In another embodiment, the OS may use secondary status signals, rather than GPIO signals, to trigger release of the data storage device. For example, a serial general purpose input output (SGPIO) interface provides an SDataOut line that carries Activity, Fault and Locate bits that indicate when a drive port is enabled. If the SGPIO signals indicate that the drive is active, then the data storage device remains locked. Optionally, device lock control logic may unlock (release) the data storage device in response to all three SGPIO bits being asserted for a predetermined period of time, such as 2 seconds. This condition may be satisfied when the port coupled to the data storage device is kept in reset. Accordingly, the device drivers within the OS or system firmware may put the port in reset thus asserting the SGPIO signals that are monitored by the device lock control logic. The device lock control logic may release the device lock in response to detecting the inactive state of the data storage device as indicated by the SGPIO signals. The installation of a data storage device into the computer system will be detected by the OS or firmware such that the device driver will present the SGPIO signals to their active states thus requiring the device lock control logic to enable (lock) the device lock.

In one embodiment, the data storage device is determined to be "not active" by determining that all read operations and write operations for the data storage device have completed. In other words, there are no pending read or write operations associated with memory addresses on the data storage device, and all data transfers have quiesced. This condition may be determined by either the operating system, which initiates read and write operations, or the drive controller in the system, which executed the read and write operations.

The methods of the present invention are especially beneficial when used to secure and release a simple swap data storage device, such as in a computer sytem having a single hard disk drive. Removal of such a simple swap data storage device during system operation may lead to data and/or operating system corruption. The methods of the present inventon protect the data on a simple swap storage device by ensuring that that data is quiesced before the device may be removed. For example, all caches are preferably flushed to the data storage device before unlocking the data storage device.

Device lock control logic consistent with embodiments of the invention may be implemented by firmware on a programmable device, such as an FPGA. In either instance, the device lock control logic controls a switch mechanism that selectively locks the storage device in an operable position within a chassis bay of the computer system, thus preventing accidental removal. During specific times in the startup or operating phase of the system, the device lock control logic asserts a GPIO which uses a solenoid or some other locking mechanism to secure the storage device in place. For example, the storage device may be secured in place during OS boot, during OS detection, during device driver update, and (for a data drive) during an application save. The method only releases the lock (de-asserts the GPIO) at the phases where it is permissible to swap the storage device, such as during memory test, memory initialization, and PCIe device instantiation.

Another embodiment of the present invention provides a computer program product including computer readable program code embodied on a computer readable storage medium. The computer program product comprises computer readable program code for securing a hot-swap data storage device against being manually physically removed from an operable position within a chassis bay of a computer system; and computer readable program code for releasing the hot-swap data storage device to be manually physically removed from the operable position within the chassis bay of the computer system in response to determining that the data storage device is not in use.

FIG. 1 is a diagram of a data storage device 10 in alignment for insertion into a bay 32 of a chassis 30 that includes a computer system. The data storage device 10 includes a housing 12 that contains storage media. The device 10 may further include side rails 14 that guide the device into the bay 32 and a handle 16 that facilitates insertion and removal of the device. For example, the handle 16 may include a pawl 18 that is engageable with the bay 32 so that closing the handle will apply an insertion force that completes a connection between the device connector 19 on the leading end of the device and a chassis connector (not shown) within the bay 32. The data storage device 10 also includes a device lock 20 in accordance with one embodiment of the invention.

Figure 2:
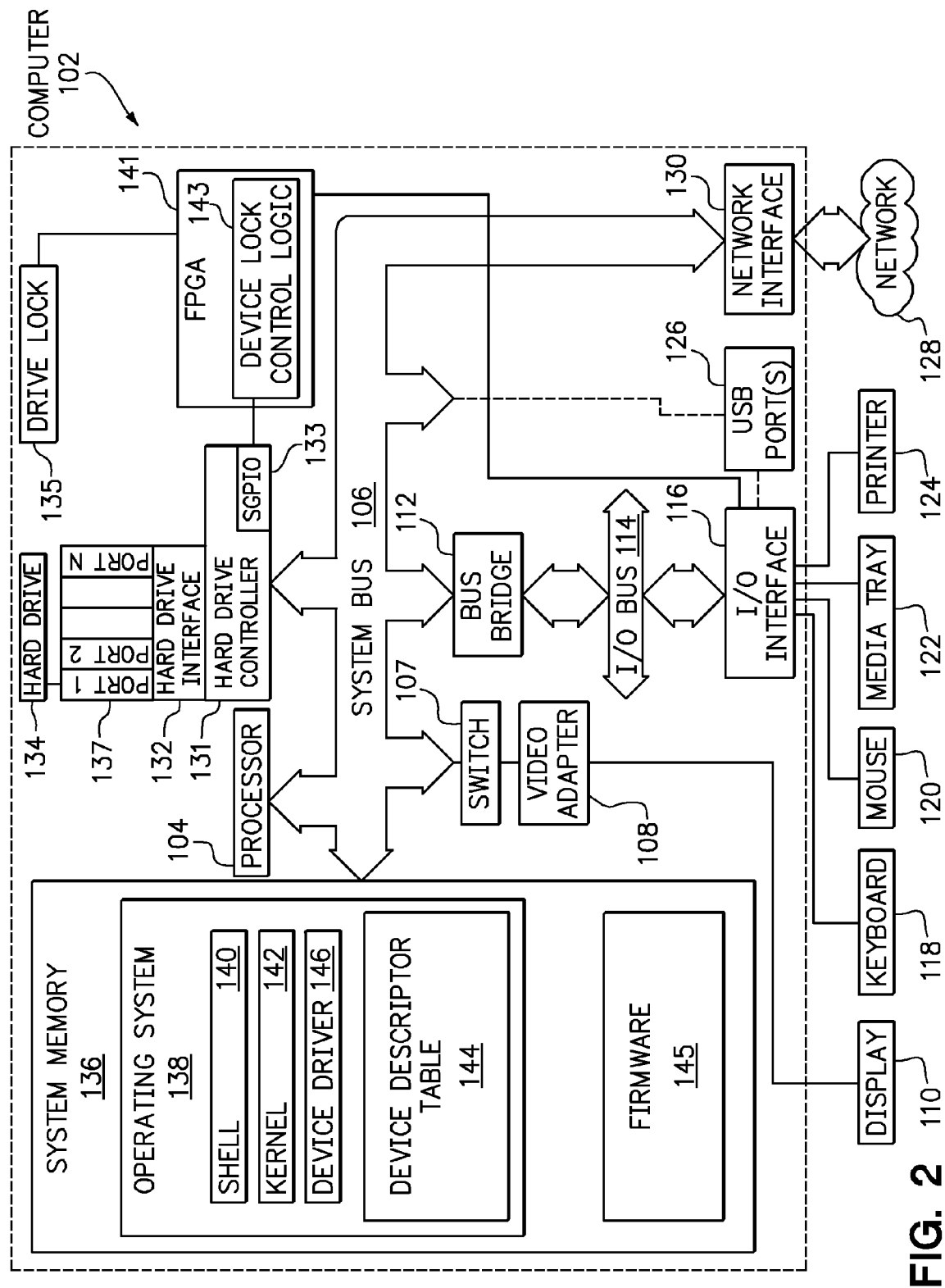
FIG. 2 is a diagram of an exemplary computer that may be utilized by the presently disclosed method, system, and/or computer program product.

FIG. 2 is a diagram of an exemplary compute node (or simply "computer") 102 that may be utilized in accordance with one or more embodiments of the present invention. Note that some or all of the exemplary architecture, including both depicted hardware and software, shown for and within a computer 102 that may be contained within the chassis 30 as shown in FIG. 1.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate over a network 128 using a network interface 130. Network 128 may be an external network such as the Internet, or an internal network such as an Ethernet or a virtual private network (VPN).

A hard drive controller 131 is also coupled to the system bus 106. Hard drive controller 131 communicates with a hard drive 134 (See also data storage device 10 of FIG. 1) through a hard drive interface 132 and one of the ports 137. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs, including memory management, process and task management, disk management, and mouse and keyboard management. The operating system 138 may further include a device driver 146 and a device descriptor table 144. Application programs may also be stored in the system memory.

The device driver 146 (for the hard disk drive 134) may use secondary status signals to trigger release of the hard disk drive 134 that is selectively secured by a device lock 135. For example, the device driver 146 within the OS 138 may put the port to the hard disk drive in reset and present serial general purpose input output (SGPIO) signals 133 that indicate whether the hard disk drive 134 is active or inactive. A field-programmable gate array (FPGA) 141 is programmed with the device lock control logic 143 that monitors these SGPIO signals 133. If the SGPIO signals indicate that the hard disk drive 134 is active, then the device lock 135 is engaged (locked) to secure the hard disk drive 134 against removal. Optionally, device lock control logic 143 may unlock (release) the hard disk drive 134 in response to all three SGPIO bits being asserted for a predetermined period of time, such as 2 seconds. This condition may be satisfied when the port coupled to the hard disk drive controller 131 is kept in reset. The device lock control logic 143 may disengage (unlock) the device lock 135 to release the hard disk drive 134 in response to detecting the inactive state of the hard disk drive as indicated by the SGPIO signals 133.

The hardware elements depicted in computer 102 are not intended to be exhaustive, but rather are representative components suitable to perform the processes of the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 3:
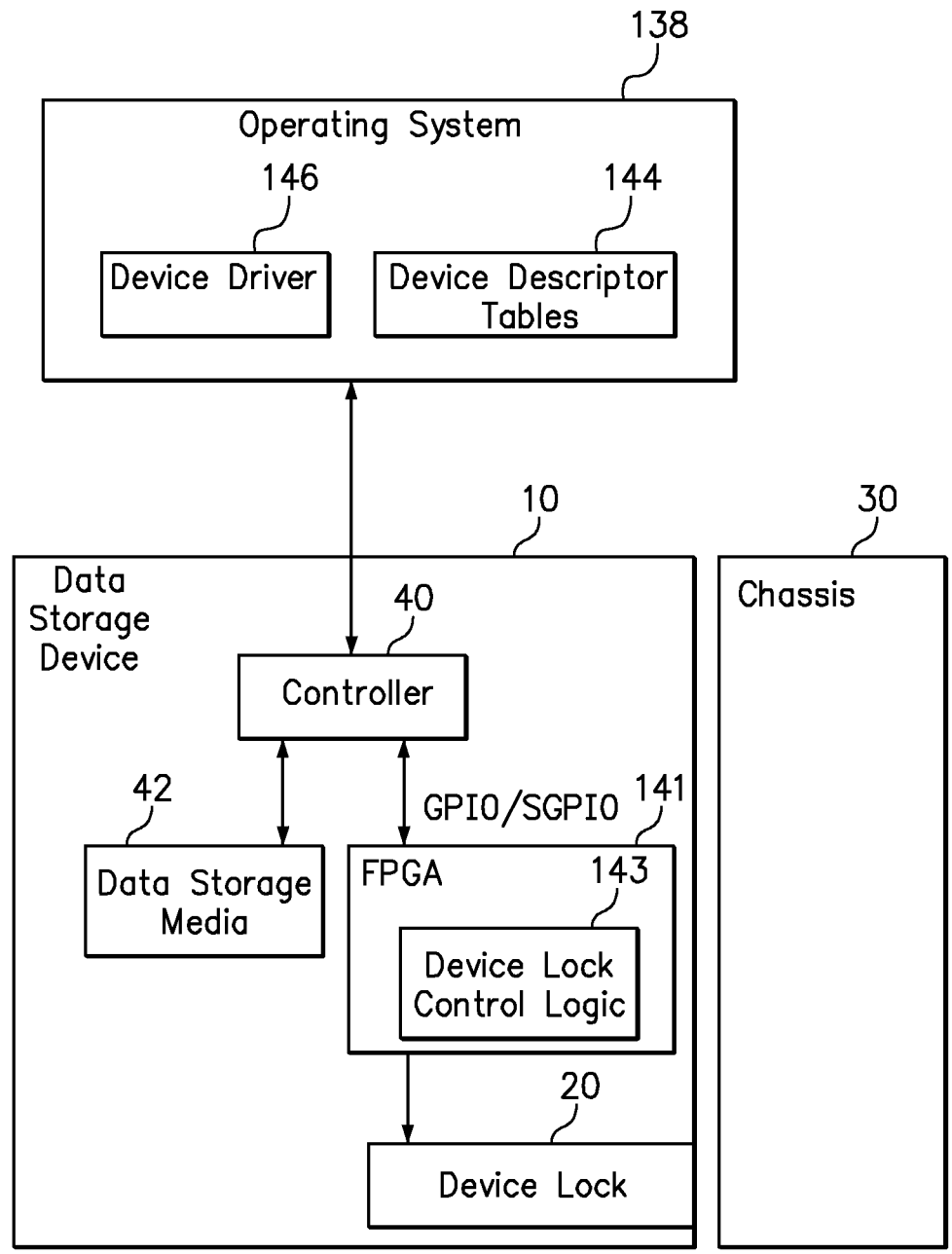
FIG. 3 is a system diagram in accordance with an embodiment of a data storage device having a device lock.

FIG. 3 is a system diagram in accordance with an embodiment of the present invention. The system in FIG. 3 operates consistent with the description of FIG. 2, but has been simplified. The data storage device 10 includes a device lock 20 that receives a control signal, such as a GPIO or SGPIO signal, from a storage device controller 40. The controller 40 may be the same controller that handles read and write operations to and from the data storage media 42. The device lock control logic 143 embodied in the FPGA 141 operates the device lock 20.

As shown, the operating system 138 includes a device descriptor table 144 including the information about the data storage device 10. Accordingly, the operating system 138 has been informed that the data storage device 10 includes the device lock 20, and the operating system 138 may cause the device lock 20 to release the data storage device 10 from the chassis 30 (see bay 32 in FIG. 1). Since the operating system sends read and write operations to the data storage device controller 40, the operating system is able to determine whether the data storage device is in use performing a read or write operation.

Figure 4:
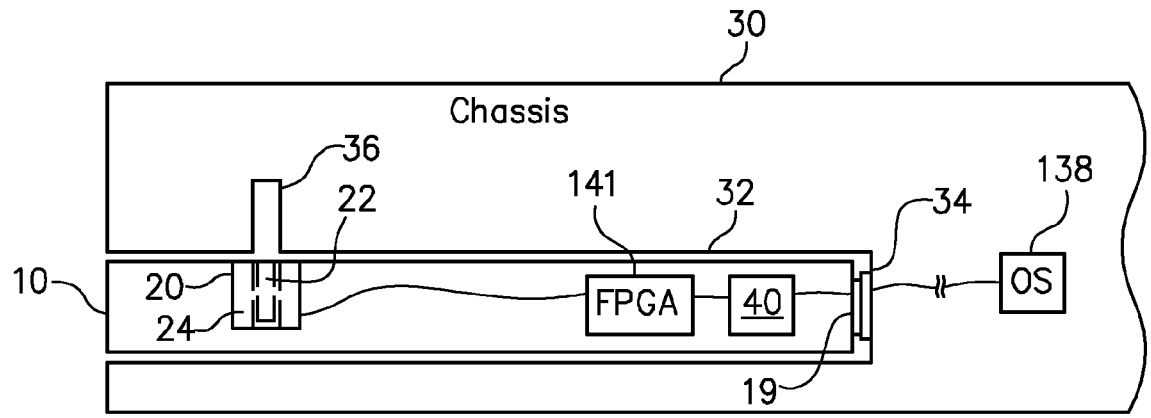
FIG. 4 is a schematic side view of the system of FIG. 3 with the device lock in an unlocked condition for releasing the data storage device from the chassis bay.

FIG. 4 is a schematic side view of the chassis 30 with the data storage device 10 received in the chassis bay 32. The data storage device 10 has a device connector 19 that has connected to a chassis connector 34 within the chassis bay 32. This connection allows the data storage device to receive power from a chassis power supply (not shown) as well as establish communication between the controller 40 and the operating system 138 (see also FIG. 3). The controller 40 is coupled by the SGPIO or GPIO interface to the FGPA 141 containing the device lock control logic (see FIG. 3) that communicates over a signal wire to the device lock 20. The device lock 20 is shown in an unlocked condition, such that the data storage device 10 may be removed from the chassis bay 32.

Figure 5:
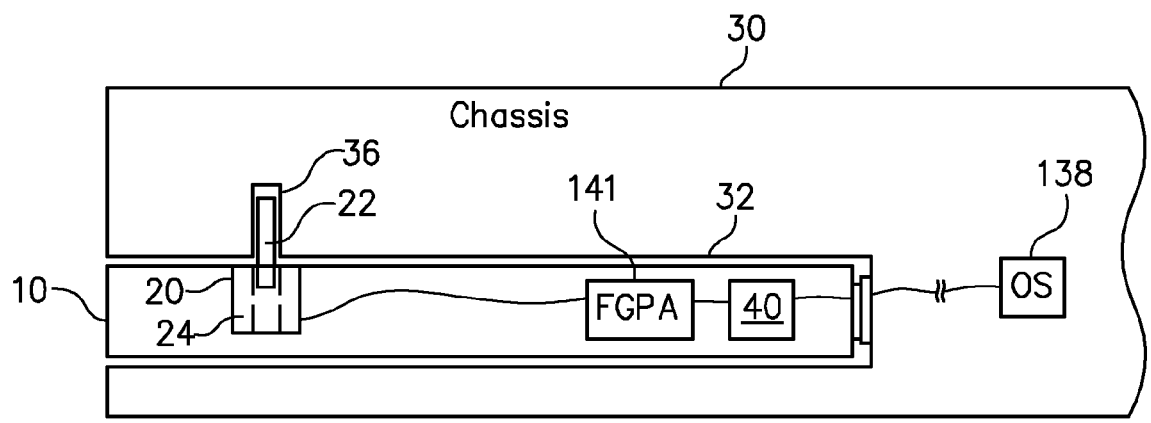
FIG. 5 is a schematic side view of the system of FIG. 4 with the device lock in a locked condition for securing the data storage device within the chassis bay.

FIG. 5 is a schematic side view of the chassis 30 and data storage device 10 of FIG. 4 with the device lock 20 in a locked condition, such that the data storage device 10 is secured within the chassis bay 32. The device lock 20 is in a locked condition because its locking pin 22 is extending outward from the coil 24 and has been received into a receiving hole or other physical feature 36 of the chassis 30. Accordingly, with the extended locking pin 22 received within, or otherwise engaging, the feature 36 of the chassis, the data storage device 10 cannot be removed from the chassis bay 32.

In reference to FIGS. 4 and 5, the locking pin 22 is able to retract within the coil 24 under gravity such that the data storage device may be removed when power is off (see FIG. 4) and the FPGA 141 must enable power to the coil 24 to extend the locking pin 22 into engagement with the receiving hole 36 (see FIG. 5).

Figure 6:
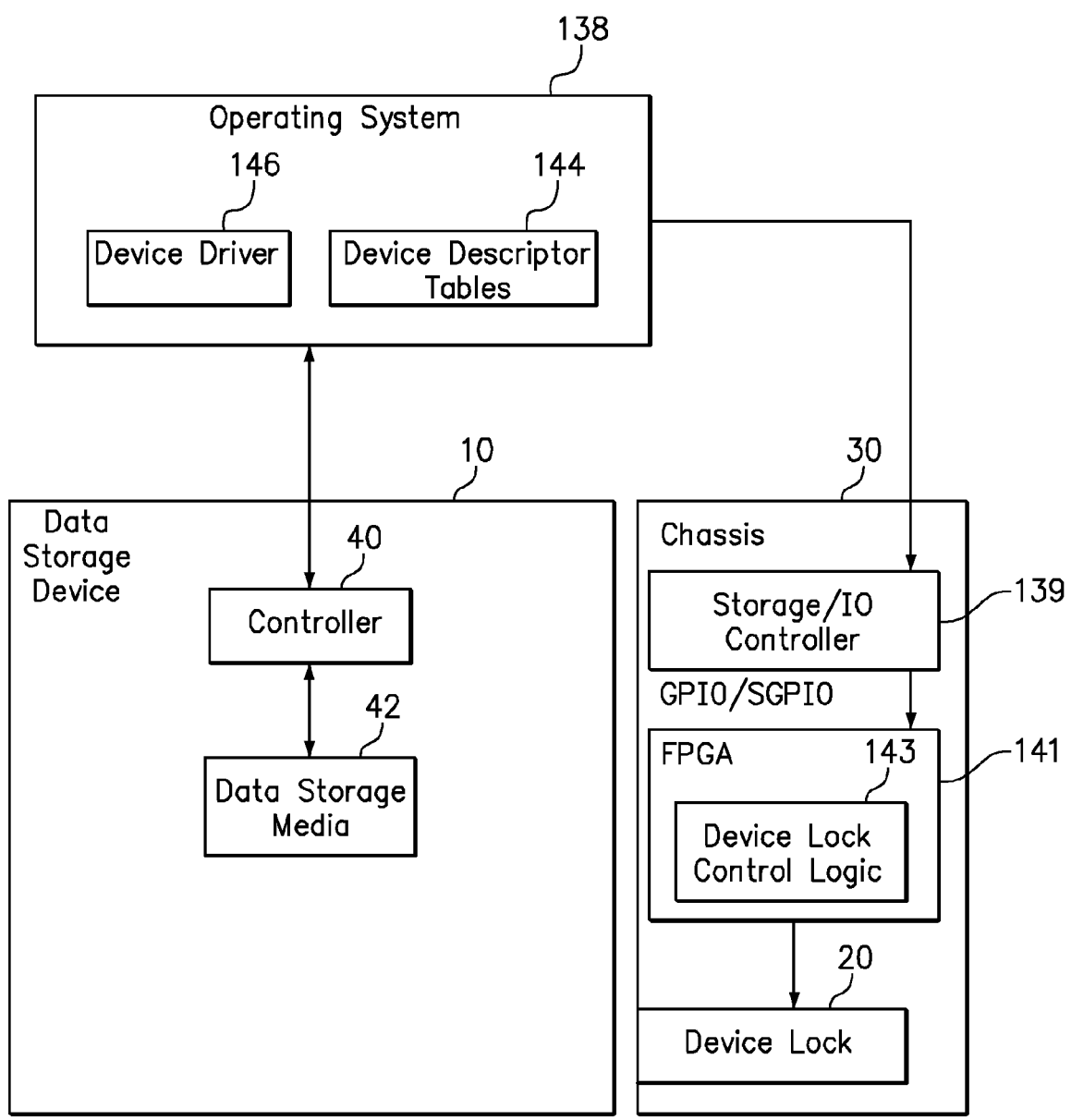
FIG. 6 is a system diagram in accordance with an embodiment of a chassis having a device lock for selectively securing a data storage device.

FIG. 6 is a system diagram in accordance with a second embodiment of the invention. The operating system 138, data storage device 10, and chassis 30 are similar to those of FIG. 3-5, except that the device lock 20 is a component of the chassis 30, rather than the data storage device 10. Accordingly, the FPGA 141 containing the device lock control logic 143 is preferably also part of the chassis 30. As with the former embodiment, when the operating system determines that the data storage device is not active, and the data would not be corrupted if the data storage device 10 were removed, then the operating system 138 uses a device driver 146 to send a signal to a storage/IO controller 139 in the chassis 30. The storage/IO controller 139 may send a subsequent signal, such as a GPIO signal, to the FPGA 141 containing the device lock control logic 143, which in turn causes the device lock 20 to release the data storage device 10 from the chassis 30.

Figure 7:
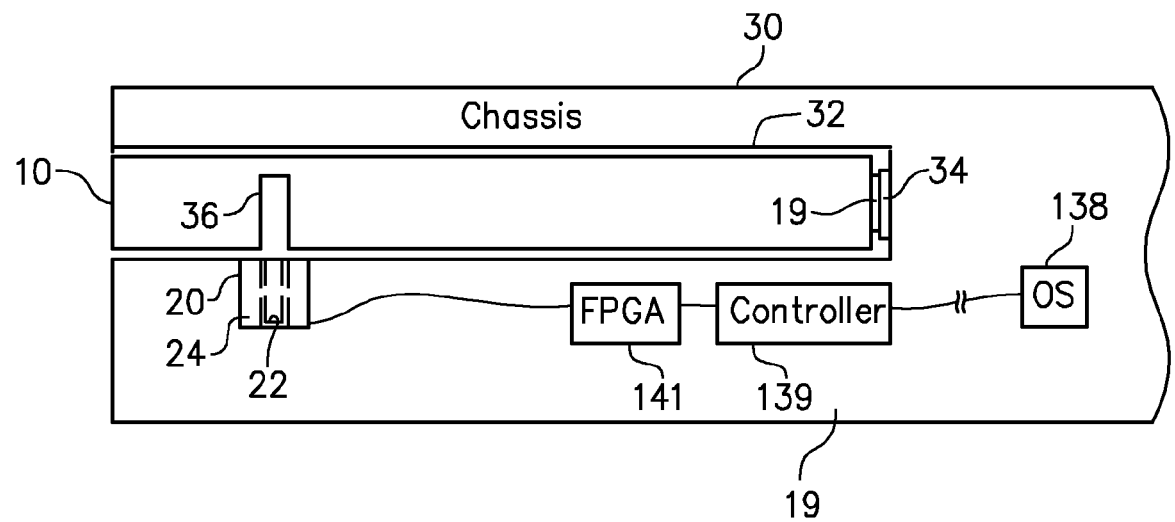
FIG. 7 is a schematic side view of the system of FIG. 6 with the device lock in an unlocked condition for releasing the data storage device from the chassis bay.

FIG. 7 is a schematic side view of the chassis 30 with the data storage device 10 received in the chassis bay 32. The data storage device 10 has a device connector 19 that is connected to a chassis connector 34 within the chassis bay 32, such that the data storage device is in an operable position. The operating system 138 can communicate with the storage controller 139. The storage controller 139 is in communication with the FPGA 141 that controls the device lock 20, which is part of the chassis 30. The device lock 20 is shown in an unlocked condition, such that the data storage device 10 may be removed from the chassis bay 32.

Figure 8:
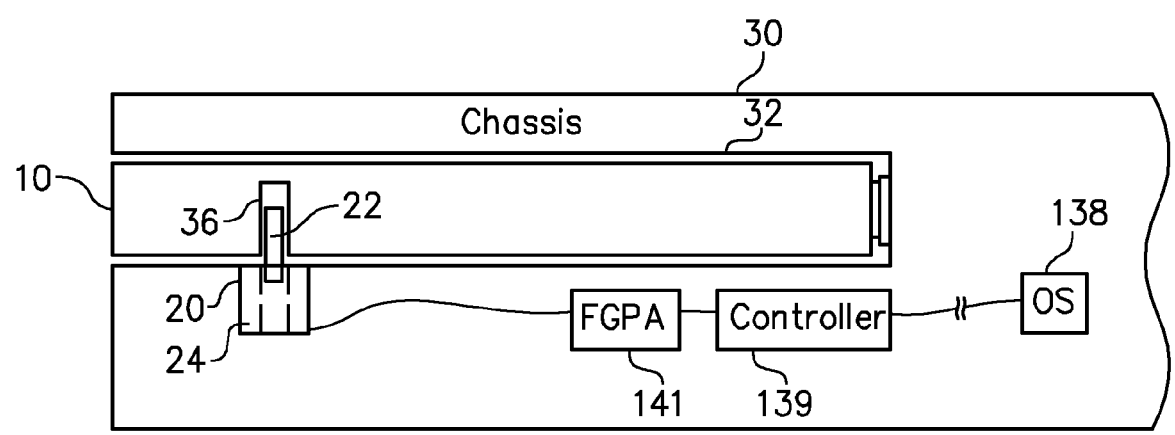
FIG. 8 is a schematic side view of the system of FIG. 7 with the device lock in a locked condition for securing the data storage device within the chassis bay.

FIG. 8 is a schematic side view of the chassis 30 and data storage device 10 of FIG. 7 with the device lock 20 in a locked condition, such that the data storage device 10 is secured within the chassis bay 32. The device lock 20 is in a locked condition because its locking pin 22 is extending outward from the coil 24 and has been received into a receiving hole or other physical feature 36 of the data storage device 10. Accordingly, with the extended locking pin 22 received within, or otherwise engaging, the feature 36 of the data storage device, the data storage device 10 cannot be removed from the chassis bay 32.

In reference to FIGS. 7 and 8, the locking pin 22 may passively retract to release the data storage device (see FIG. 7), such as under the force of gravity, and the FPGA 141 must enable power to the coil 24 to extend the locking pin 22 from the coil 24 (i.e., into of engagement with the receiving hole 36) (see FIG. 8).

In reference to FIGS. 4-5 and 7-8, it should be recognized that the coil 24 may be responsible for both extension and retraction, and that the device lock may be oriented in various ways, such as either vertically or horizontally. Furthermore, the device lock itself may use various types of actuators.

Figure 9:
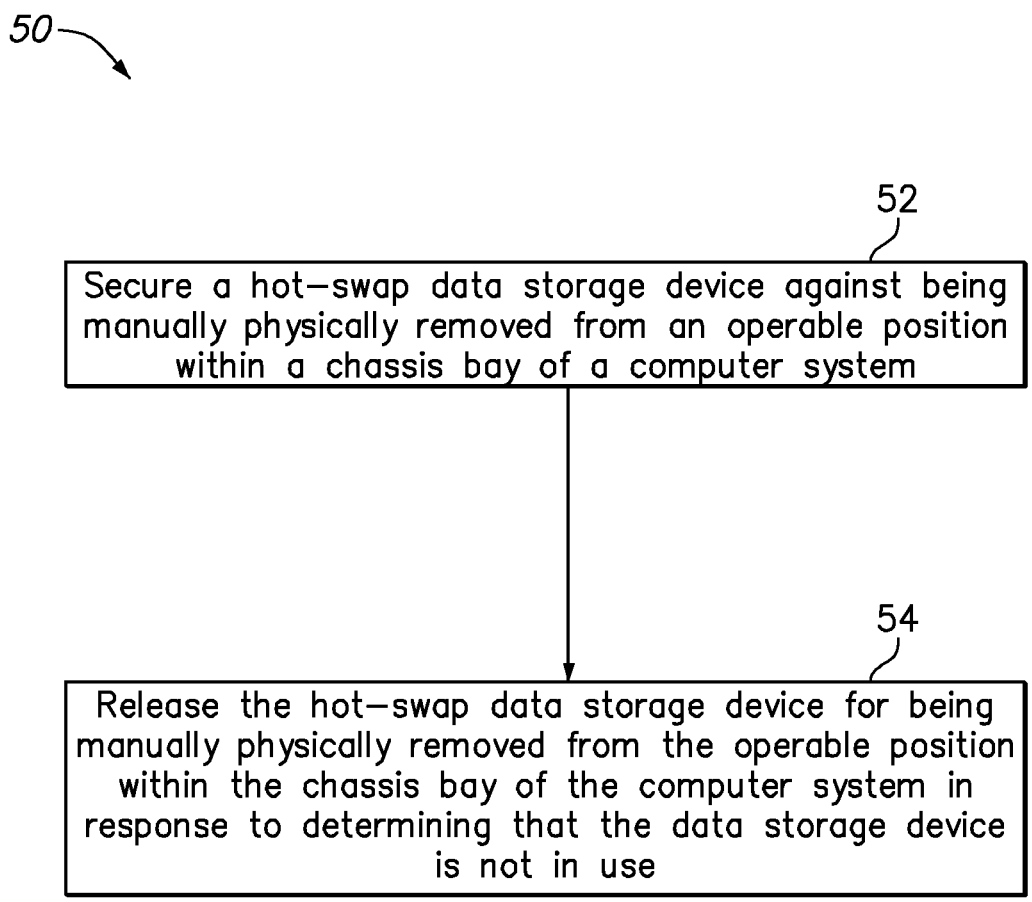
FIG. 9 is a flowchart of a method of controllably securing and releasing the data storage device from an operable position within a bay of a computer system.

FIG. 9 is a flowchart of a method 50 of controllably securing and releasing the data storage device from an operable position within a bay of a computer system. Step 52 includes securing a hot-swap data storage device against being manually physically removed from an operable position within a chassis bay of a computer system. Step 54 includes releasing the hot-swap data storage device for being manually physically removed from the operable position within the chassis bay of the computer system in response to determining that the data storage device is not active.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language, Verilog, VHDL (VHSIC Hardware Description Language), assembly language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   securing a hot-swap data storage device against being manually physically removed from an operable position within a chassis bay of a computer system, wherein the hot-swap data storage device is secured by a locking pin extending between the hot-swap data storage device and the chassis bay; and
   releasing the hot-swap data storage device for being manually physically removed from the operable position within the chassis bay of the computer system in response to determining that the data storage device is not active, wherein the hot-swap data storage device is released by retracting the locking pin so that the locking pin does not extend between the hot-swap data storage device and the chassis bay.

2. The method of claim 1, wherein securing the hot-swap data storage device includes asserting a general purpose input output signal to the electronically actuated lock.

3. The method of claim 1, wherein releasing the hot-swap data storage device includes deasserting the general purpose input output signal to the electronically actuated lock.

4. The method of claim 1, wherein securing and releasing of the hot-swap data storage device is controlled by a serial general purpose input output signal.

5. A method, comprising:
   securing a hot-swap data storage device against being manually physically removed from an operable position within a chassis bay of a computer system; and
   releasing the hot-swap data storage device for being manually physically removed front the operable position within the chassis bay of the computer system in response to determining that the data storage device is not active, wherein securing and releasing of the hot-swap data storage device is controlled by a serial general purpose input output signal, wherein the serial general purpose input output signal includes activity, fault and locate signals, and wherein the hot-swap data storage device is determined to he not active in response to assertion of the activity, fault and locate signals.

6. The method of claim 1, wherein the chassis bay includes an electronically actuated lock for securing and releasing the hot-swap data storage device.

7. The method of claim 6, Wherein the electronically-actuated lock includes a solenoid for selectively extending and retracting the locking pin.

8. The method of claim 1, wherein the hot-swap data storage device includes an electronically actuated lock for securing and releasing the hot-swap data storage device.

9. The method of claim 8, wherein the electronically-actuated lock includes a solenoid for selectively extending and retracting the locking pin.

10. The method of claim 1, wherein determining that the data storage device is not active includes detecting that a port is in reset, wherein the data storage device is connected to the port.

11. The method of claim 1, further comprising:
    communicating swap drive characteristics front firmware on the data storage device to the operating system.

12. The method of claim 11. further comprising:
    storing the swap drive characteristics in a descriptor table accessible to the operating system.

13. The method of claim 1, wherein determining that the data storage device is not active includes determining, that all read operations and write operations for the data storage device have completed.

14. The method of claim 1, wherein the hot-swap data storage device is secured against being manually physically removed while the computer system is powered off.

15. The method of claim 14, wherein the hot-swap data storage device is secured by an electronically-actuated lock that is passively locked and requires electronic actuation to release the data storage device.

16. The method of claim 1, wherein the hot-swap data storage device is a simple swap data storage device.

17. A computer program product including computer readable program code embodied on a non-transitory computer readable storage medium, the computer program product including:
    computer readable program code for securing a hot-swap data storage device against being manually physically removed from an operable position within a chassis bay of a computer system, wherein the hot-swap data storage device is secured by a locking pin extending between the hot-swap data storage device and the chassis bay; and
    computer readable program code for releasing the hot-swap data storage device to be manually physically removed from the operable position within the chassis bay of the computer system in response to determining that the data storage device is not active; wherein the hot-swap data storage device is released by retracting the locking pin so that the locking pin does not extend between the hot-swap data storage device and the chassis bay.

* * * * *